(12) United States Patent
Watkins

(10) Patent No.: US 6,922,679 B2
(45) Date of Patent: Jul. 26, 2005

(54) SOFTWARE INTEGRATION METHOD TO AUTOMATE LIGHTING CONTROL AT PARKS AND RECREATION FACILITIES

(76) Inventor: Gregg S. Watkins, 12427 N. 66th St., Scottsdale, AZ (US) 85254

(*) Notice: Subject to any disclaimer, the term of this patent is extended or adjusted under 35 U.S.C. 154(b) by 146 days.

(21) Appl. No.: 10/191,579

(22) Filed: Jul. 8, 2002

(65) Prior Publication Data

US 2003/0009263 A1 Jan. 9, 2003

Related U.S. Application Data

(60) Provisional application No. 60/303,681, filed on Jul. 6, 2001.

(51) Int. Cl.[7] .............................................. G06F 15/18
(52) U.S. Cl. .............................. 706/14; 706/10; 706/11
(58) Field of Search ............................... 706/10, 11, 14

(56) References Cited

U.S. PATENT DOCUMENTS

2001/0010032 A1 * 7/2001 Ehlers et al. ................. 702/62
2002/0002425 A1 * 1/2002 Dossey et al. ............... 700/284
2002/0009975 A1 * 1/2002 Janusz et al. .................. 455/73
2002/0097193 A1 * 7/2002 Powers ........................ 345/2.3

* cited by examiner

Primary Examiner—Joseph P. Hirl
(74) Attorney, Agent, or Firm—Jeffrey D. Moy; Harry M. Weiss; Weiss, Moy & Harris, P.C.

(57) ABSTRACT

In accordance with one embodiment of the present invention, a software integration program to automate lighting control is disclosed. The software integration program comprises a computer usable medium having computer readable program code embodied in the medium for control of remote control units (RCUs) manufactured by a first company based on information received from facilities reservation and booking software (FRBS) developed by a different company; computer readable program code means for setting up lighting related options and preferences from a remote location; computer readable program code means for allowing a user to assign remote control units (RCUs) and zones to appropriate locations, the location having data within the database of the FRBS; computer readable program code means for getting data from the database of the FRBS; and working with the data to automate lighting control.

13 Claims, 2 Drawing Sheets

Diagram of a Stand-Alone System

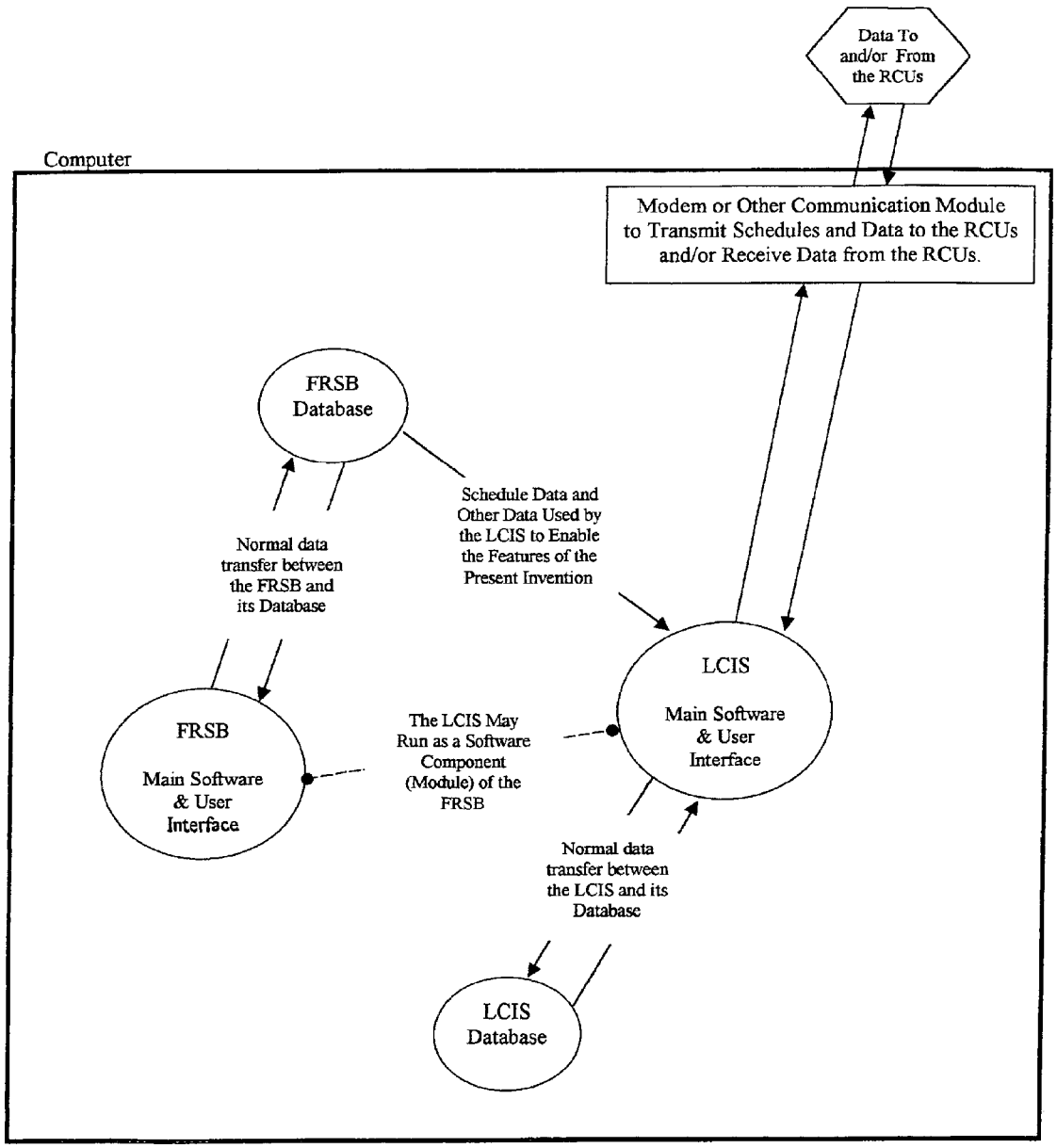
Diagram of a Stand-Alone System  Fig. 1

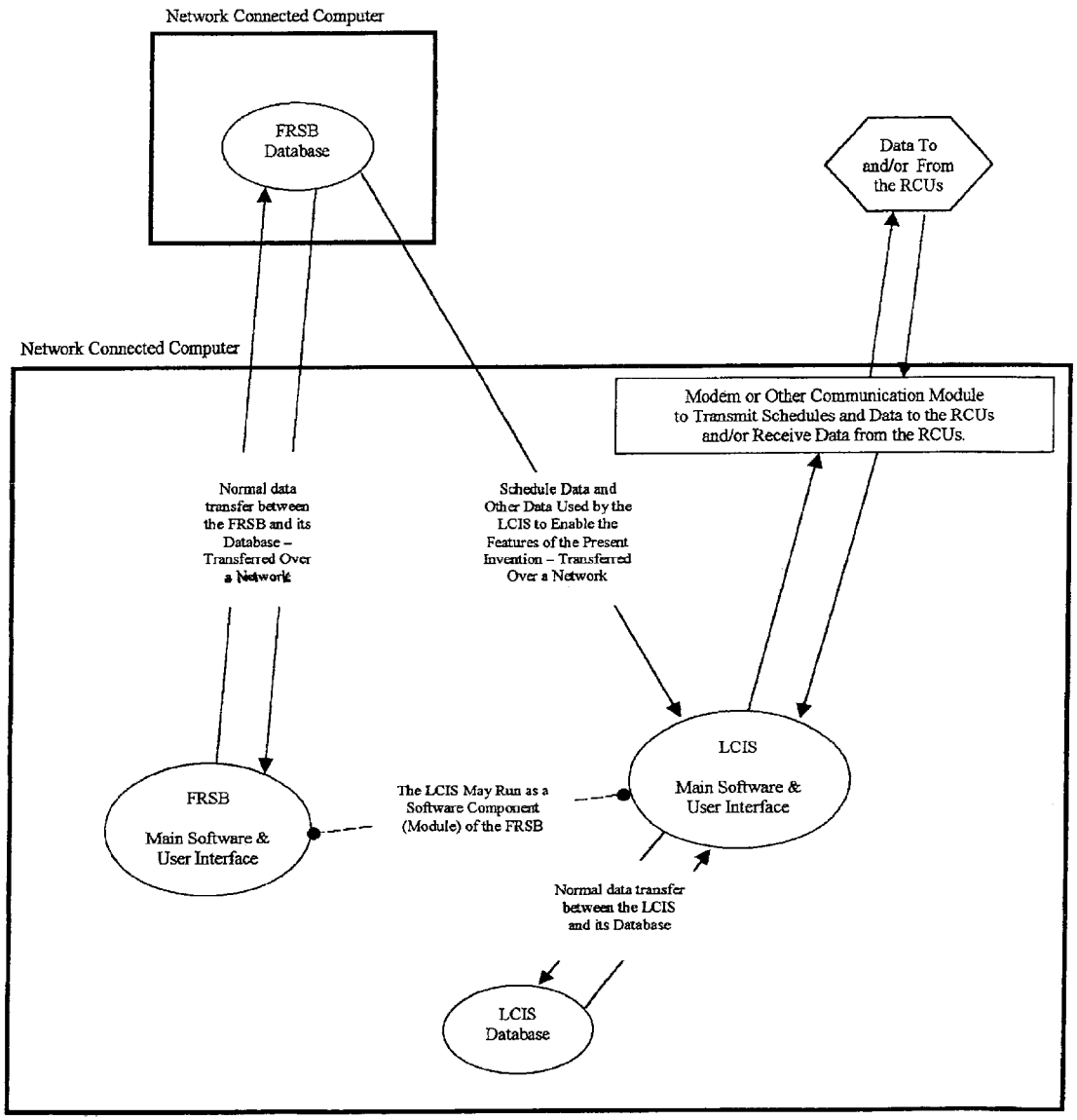
Diagram of a Networked System  Fig. 2

SOFTWARE INTEGRATION METHOD TO AUTOMATE LIGHTING CONTROL AT PARKS AND RECREATION FACILITIES

RELATED APPLICATIONS

This patent application is claiming the benefit of the U.S. Provisional Application having an application number of 60/303,681, filed Jul. 6, 2001, in the name of Gregg S. Watkins, and entitled SOFTWARE INTEGRATION METHOD TO AUTOMATE LIGHTING CONTROL AT PARKS AND RECREATION FACILITIES.

FIELD OF THE INVENTION

This invention relates to lighting and, more specifically, to a software integration method to automate lighting control at parks, recreation facilities, and the like.

BACKGROUND OF THE INVENTION

There is a need to better automate the control (turning On and Off) of lighting at parks and recreation facilities based upon the timing and need of the customer; and in particular the control of ball-field lighting at these facilities. The standard method for controlling 'general' commercial outdoor lighting incorporates a time clock and/or photocell to control the respective lighting. In the case of roadway lighting for example, a photocell may be used to turn on the lights when it becomes dark and turn the lights off when it becomes light in the morning. Or in the case of parking lot lighting, a photocell and time clock combination may be used. The photocell would turn on the lights at sunset and an off-time set within a time clock on the same circuit would turn the lights off at a point later in the night. The problem with this traditional lighting control as it relates to ball-field lighting is that the lighting need is not always consistent for a particular facility and the times needed usually vary. Therefore the very consistent and repetitive nature of photocell and/or time clock control doesn't work very well for ball-field lighting control.

The current methods of ball-field lighting control usually involve a person (with keys to a switch box) that roams the parks to turn on and off lights for players, or the use of time clocks, or some combination thereof. There are also some more sophisticated methods of control that exist whereby the parks personnel are able to send lighting schedules via telephone to lighting remote control units. Usually related to the former, is a computer and software that gives the users the ability to enter lighting schedules for several parks facilities and gives the user a certain amount of automated control over their ball-field lighting. Once the user enters the schedules for the various ball-fields, the computer/software combo will utilize a modem and dial out to send the schedules to the remote control units located at the park facilities.

Basically unrelated to the former, is the fact that many parks and recreation departments utilize software to reserve and schedule (book) facilities for use by customers such as Little League teams, softball leagues, soccer leagues, etc. This software is often referred to as Facilities Reservation and Booking Software (FRBS) and works in a similar fashion as software packages that reserve (or book) rooms for hotels, etc. As with many industries, there are just a few of these FRBS companies and these companies have a major portion of the parks and recreation market. Unfortunately, at the present time there is an inability to integrate the lighting control software with facilities reservation and booking software (by others), whereby lighting schedules are prepared from data obtained from the facilities reservation and booking software. These schedules are then subsequently sent out to remote control units (RCUs) at the various respective parks and recreation facilities.

There are some companies that both develop software for the scheduling of remote control units (and FRBS) and also manufacture the remote control units themselves. However, as stated above, problems exist in cases where the developer of the FRBS is different from the manufacturer of the RCUs.

The major FRBS companies do not manufacture hardware that can remotely control the lighting. There have been attempts by developers of FRBS to integrate their product with 'integration' software developed by manufactures of remote control units. This process requires the FRBS to output a file (that is not normally required by the facilities reservation and booking software, and therefore it is special and done for the remote control unit manufacturer) that will be read and processed by software developed by the manufacturer of the remote control units. Additionally, the output of this special file only occurs when the user demands it by pressing some sort of control icon or button on the user interface of either software. In other words, the process of outputing the file is not 'Automated'.

Therefore a need existed to provide a method that would be employed in the case where the developer of the FRBS is different from the manufacturer of the RCUs. In other words, a need existed to provide a method that facilitates the control of remote control units manufactured by Company-A based on information received or gotten from facilities reservation and booking software developed by a different Company-B by way of lighting control integration software (LCIS). A need existed to provide a method whereby the output of any special file would be automated. The method includes methodology whereby a special file is not necessary because the data files of the FRBS are read 'directly' by the lighting control integration software. In this case, virtually no changes are required of the FRBS for the system to work. The software would be used in its usual manner and the LCIS would automatically read the data, prepare schedules and send the schedules out to the remote control units.

SUMMARY OF THE INVENTION

In accordance with one embodiment of the present invention, it is an object of the present invention to provide a method that would be employed in the case where the developer of the FRBS is different from the manufacturer of the RCUs. In other words, a need existed to provide a method that facilitates the control of remote control units manufactured by Company-A based on information received or gotten from facilities reservation and booking software developed by a different Company-B by way of lighting control integration software (LCIS).

It is another object of the present invention to provide a method whereby the output of any special file would be automated.

It is still another object of the present invention to provide a method that includes a methodology whereby a special file is not necessary because the data files of the FRBS are read 'directly' by the lighting control integration software. In this case, virtually no changes are required of the FRBS for the system to work. The software would be used in its usual manner and the LCIS would automatically read the data, prepare schedules and send the schedules out to the remote control units.

BRIEF SUMMARY OF THE INVENTION

In accordance with one embodiment of the present invention, a software integration program to automate lighting control is disclosed. The software integration program comprises a computer usable medium having computer readable program code embodied in the medium for control of remote control units (RCUs) manufactured by a first company based on information received from facilities reservation and booking software (FRBS) developed by a different company; computer readable program code means for setting up lighting related options and preferences from a remote location; computer readable program code means for allowing a user to assign remote control units (RCUs) and zones to appropriate locations, the location having data within the database of the FRBS; computer readable program code means for getting data from the database of the FRBS; and working with the data to automate lighting control.

BRIEF DESCRIPTION OF THE DRAWINGS

FIG. 1 is a simplified functional block diagram of a stand alone system embodying the present invention.

FIG. 2 is a simplified functional block diagram of a networked system embodying the present invention.

Common reference numerals are used throughout the drawings and detailed descriptions to indicate like elements.

DETAILED DESCRIPTION

Since there is already software in the market that performs the task of reserving and/or booking facilities (including ball-fields) for users, teams, etc., then why not use this information as a basis for making lighting control schedules for any of the facilities that have lighted playing surfaces? And why not make this process seamless to the developer of the FRBS if so desired? The present invention is a method for doing so. The software vehicle that the present invention utilizes is referred to as the lighting control integration software or LCIS.

Setting up lighting related options and preferences is an important aspect of the present invention. The present invention allows users of FRBS to set up preferences related to lighting control that are not normally a part of the FRBS. The preferences include all lighting related criteria such as warm-up time, sunset times, lights-off grace periods, etc. and are all set up in the lighting control integration software (preferably set up in the LCIS, but may be set up in the FRBS if so desired by the developer of the FRBS).

Making RCU assignments and easy database connectivity (the FRBS's database) are important aspects of the present invention. The present invention allows users to easily assign remote control units (RCUs) and zones to appropriate ball-fields (ball-fields who's data is located within the FRBS's database). All integration information such as RCU/Zone assignments, database connectivity information, etc. is set up in the lighting control integration software (preferably set up in the LCIS, but may be set up in the FRBS if so desired by the developer of the FRBS).

Additional settings such as modem settings, AutoSend settings, etc. are also set up in the lighting control integration software (preferably set up in the LCIS, but may be set up in the FRBS if so desired by the developer of the FRBS).

Getting data from the FRBS's database is an important aspect of the present invention. The lighting control integration software either reads special output files produced by the FRBS, or reads the data directly from the database of the FRBS (the LCIS may work either way depending on the integration desire by the developer of FRBS). The lighting control integration software either works directly with this data, or assembles the data in the LCIS's internal database and then works with data. Working with the data means taking the reservation/booking information, which is usually a set of beginning and ending date and times, then after applying information set forth in the set up of the lighting control integration software, lighting schedules are produced. For example if a reservation is made for a ball-field that begins at 3 pm and ends at 8 pm (and assume the following: a) sunset is 5:30 pm, b) the user has set a 30-minute offset to sunset, c) lights need 10 minutes to warm up, and d) the user set a 15-minute grace period), then the lights will go on at 4:50 pm and off at 8:15 pm. Depending on how the user has set up the system, the lighting control integration software will ultimately send the information out to the RCUs. All schedule information and other pertinent user information, etc. is warehoused by the internal database of the lighting control integration software and various reports may be prepared from such data.

The present invention allows for automating the process of getting data from or receiving data from the FRBS and is an important aspect of the invention. Once the setup information is entered, the calculation and preparation of lighting schedules and ultimate sending of such schedules to the RCUs may be totally automatic if so desired by the user. The invention allows for several methods of automating the data transfer process depending on the desires of the FRBS, the situation and/or the application. In general, two basic things must occur so that automation may occur: 1)the LCIS needs to be notified to grab data from the FRBS or the LCIS can poll the data at a predetermined time and 2)once the data is transferred and schedules made they need to be sent to the RCUs. It is not the intention of this invention to narrow down the ways in which the prior two items get performed; rather, it is the fact the process is automated by the present invention that is unique . . . regardless how it is done. Some examples of methods to notify the LCIS to get data are: 1)The LCIS polls the FRBS database regularly (with the timing of the polling being user defined), 2)The LCIS polls the FRBS database right before sending schedules out (see AutoSend feature), 3)The FRBS sends out a 'flag' file or command every time a schedule is made that the LCIS picks up via regular polling, 4)similar to 3, only the FRBS simply commands the LCIS to poll data and prepare schedules, or any combination of the previous methods. Sending the data automatically also has many methods with some being outlined in the AutoSend features of the present invention.

The sending of the data to the RCUs is generally accomplished by a modem tied to a telephone line, (however other forms of communications connectivity may be utilized including wireless methods). The telephone line then is used to call the RCUs directly, or used to tie into a wireless carrier so that the data may be sent wirelessly to the RCUs. The PC may be connected to the internet, with the resulting communication accomplished via the internet instead of using a standard telephone system to communicate transfer data to the RCUs.

The 'lines' between getting the data from the FRBS, preparing schedules and sending the schedules get blurred. Sometimes these are separate processes and other times they are performed together depending on the situation and methodology employed. But it's not that important to make these distinctions clearer in order to understand the present invention.

The aforementioned has primarily involved the sending of data to the RCUs once calculated and massaged by the LCIS. However, if a 2-way communication system exists enabling the RCUs to talk back to the LCIS, then information gathered in such a manner can be relayed to the user with the present invention. Information such as verification that the lights are on, power outage notification, field-use confirmation via keypad, etc. can be displayed on forms of the LCIS and/or logged for later printing.

Software is extremely modular and 'componentized' nowadays and it would be anticipated that the FRBS developers may wish to run the LCIS as a component of the FRBS or simply launch the LCIS from within the FRBS by way of a command button or icon.

Most of the examples given reflect only one item in calculating a lighting on and/or off time for simplicity, but in reality all of these features and preferences/settings are taken into affect when making on and off time calculations. For security purposes, some of the preferences/setting described within the various features below may not actually be set directly by the user but are on display forms which are either coded and/or have coded access. In other words, the user would be given an access code to enter the form(screen) or simply given a coded string to enter which means something to the LCIS as a setting.

Also, generally the user is able to enter all of the settings and preferences described below (not secured by code or key), but this entry may also be set-up (either in advance or on site) by the developer of the LCIS or someone else other than the user.

Virtually all of the features below may be set globally or set individually per RCU and Zone. The user interface (screens that the user sees) displays the various preferences and settings, RCUs, Zones, etc. The user interface displays the facilities and related RCU/Zones along with the bookings and lighting schedules for each. The user interface also has command buttons that allow the user to have instantaneous control over their lighted facilities in cases where they don't desire to set or book via the FRBS.

Integration Related Features:

May be run stand-alone or across networks

The LCIS may be run stand-alone or across networks. This means that the LCIS may reside on the same computer as the FRBS and the FRBS's database reside (stand-alone system), or the lighting control integration software can access the database of the FRBS across a network (networked system), of course including access across the internet network.

Works with multiple databases

Since many of the FRBS software available use many different database types (e.g., Oracle, MS SQL Server, MS Access, Sybase, etc.), the LCIS is designed to work with the particular database or databases that a respective FRBS uses.

Easy and flexible database connectivity

The LCIS includes a form which allows for the data entry of typical database connectivity information such as User ID, User Password, Database Name, Database Type, Server Name, etc.

Easily assign RCUs and Zones

The LCIS allows you to easily assign (or attach) Remote Control Units and the related Zones to facilities and ball-fields by looking up and displaying the facility from the actual data in the FRBS database; then allowing you to enter the RCU Identification Number and Zone that you wish it to be connected with.

Seamlessly read data from Facilities Reservation and Booking Software

The LCIS reads 'special output data file(s)' or reads normal data files of FRBS and either creates schedules from this data directly, or creates an internal file and prepares schedules from this internal data file. Seamlessly simply means that the user is not required to do anything special once the LCIS software is setup, the LCIS 'talks' to the FRBS 'behind the scenes'. Schedules are created with all of the preferences and lighting settings, etc. taken into account.

Lighting Related:

Sunset/Sunrise adjustment defined by user

The LCIS includes a logic function that calculates sunrise and sunset based up longitude and latitude that has been entered into the system as part of the preferences and settings options of the system. An additional setting within the preferences and setting options for the user includes an offset to sunrise and sunset times. For example, if the user wishes his/her lights to come on at 30 minutes before sunset, they enter a −30 minute value in the sunset offset option and whenever the schedules are calculated with sunset as the on time, the lights will come on 30 minutes before sunset.

Ignore off between reservations, defined by user

The FRBS may include bookings for a particular ball-field that are separated by a short time within a given evening (e.g., such as a 6 pm–8 pm booking and another from 9 pm–11 pm). Usually in these cases the parks department may not actually want the lights of the related ball-field to go out during this hour between bookings. Therefore the LCIS includes an ignore-off value option which will automatically put schedules together for lighting purposes depending the ignore-off value set. In this case, if the ignore-off value was set for 30 minutes, then the lights would go off between 8 pm and 9 pm; however if the ignore-off value was greater than 1 hour then the lights would stay on between bookings in this case.

Force on (pseudo sunset)

Even though the LCIS is capable of calculating sunrise and sunset, these times vary by a minute or so each day and the users or parks department may not actually desire that the lights perform in this manner. Therefore, there is force-on time option that the users may set and the lights will then use this on time instead of sunset. Incidentally, if the booking begin time is after the force-on time, then the lights will come on at the booking begin time (which generally would be what the user wants). If the booking begin time is 3 pm and sunset is 6:18 pm, and the user has a force-on of 6 pm, then the lights will come on at 6 pm. If the booking begin time is 8 pm and sunset is 6:18 pm, and the user has a force-on of 6 pm, then the lights will come on at 8 pm.

Force off (curfew)

Since the LCIS reads bookings made by the FRBS, it is theoretically possible to make a booking for a facility or ball-field that has an ending time that is beyond what the city allows for lights to be on. Therefore, the LCIS has a force-off option that allows the users to input a time value that the lights should go off at regardless of the ending time of the booking (unless of course the booking end time is earlier than the force-off time). In other words, if the booking ending time is greater than the force-off time then the lights will go off at the force-off time; otherwise, if the booking ending time is earlier than the force-off time then the lights will go off at the booking end time.

Overcast adjustment and application

Since it is darker earlier than normal when it is cloudy, the LCIS has an overcast adjustment that allows the user to enter an adjustment value in minutes (or possibly hours) which when applied by the user will basically make sunset earlier by this adjustment value. Therefore, once the adjustment is entered in the preferences and settings options, then anytime there is a cloudy day the user simply executes an 'apply overcast adjustment' command and all appropriate schedules will change as necessary.

Sunrise/sunset calculator

The LCIS includes a logic function that calculates sunrise and sunset based up longitude and latitude that has been entered into the system as part of the preferences and settings options of the system. Of course these times are kept, used and displayed in the local time for the user (which is known based upon other settings within the LCIS such as Time Zone and DST observance).

Lighting warm-up

The lights used to light park facilities and ball-fields are often of the High Intensity Discharge (HID) type which often takes a few to several minutes to come to full brightness after being energized. The LCIS allows the user to enter a warm-up value that will be taken into account when turning on lights for a given booking. Therefore, if a warm-up value of 15 minutes is entered and an on time is calculated from a booking to be 9 pm, the lights will actually be turned on at 8:45 pm to account for the warm-up.

Lights-off grace period (to clear fields, pick up belongings, etc.)

When a user books a facility, the user has the use of facility up to the ending time of the booking. This means that in the case of ball-fields there may be a team in the outfield right up to the ending time of the booking, at which time if the lights went out might create a dangerous situation. The LCIS allows for input of a lights-off grace period which adds this value to the booking ending time. The lights would then turn off after the booking ending time by this amount of time input as the lights-off grace period.

Dialing Control and Send Control:

Set dialing control preferences

Certain items used in dialing such as modem strings, modem settings, call out redundancy (number of times the data is repeatedly sent to the RCUs for accuracy and guaranteed delivery), wireless or non-wireless access telephone numbers are easily entered on a form within the LCIS. Some of these items may be keyed or coded so that the user doesn't actually know their values or have access to the entry screens for security.

AutoSend

Once the schedules are created they need to be sent to the RCUs, and this may be accomplished in an automatic fashion in a number of ways as preferred by the user and set in the preferences and settings options:

AutoSend—to begin at time specified by user

AutoSend—to be complete at sunset (including offset)

AutoSend—to be complete by time specified by user

AutoSend—as information is received from FRBS

There are of course special algorithms that are performed to know when to start the send process in order to finish by a certain time desired by the user. Its not necessarily the algorithm that is important, rather it is the outcome itself that is unique (e.g., the idea of completing a sending of schedules by a certain time).

The 'lines' between getting the data from the FRBS, preparing schedules and sending the schedules get blurred. Sometimes these are separate processes and other times they are performed together depending on the situation and methodology employed. But it's not that important to make these distinctions clearer in order to understand the present invention.

If the user prefers to not have the schedules sent automatically, he/she may disable AutoSend and Force Send only.

Show call progress and schedule sending progress

The LCIS will display a screen of call progress data and data related to the sending of schedules such as:

Number of schedules sent

Number of schedules queued

Current schedule being sent (including RCU, Zone, Ballfield Name, etc.)

Date and time of last send

Next send date and time

Display call and/or sending error messages

Reporting:

Report light usage by facility

The LCIS will track the light usage per complex, facility and ball-field, including tracking lamp starts/stops, time intervals between starts, etc. The purpose of these values is to aid park maintenance personnel to calculate remaining lamp life so lamp replacement may be anticipated and better planned. Additionally, other personnel may wish to know the number of hours their facilities are being used with lights, etc. These reports may be calculated showing every on and off time per date (a detail report), or may be narrowed down with certain figures being an accumulation (a summary report). The light usage detail may come from the RCUS (see Monitoring Capabilities) and therefore be different (i.e. would be actual usage) from what was originally scheduled and sent to RCUs. They may be printed and/or viewed on the computer display. They may be printed on separate pages by facility or printed on continuous paper.

Report light usage by customer

The LCIS will track the light usage per customer showing complex, facility and ballfield, times, etc. The purpose of these values is to aid park personnel in billing for lighting used. These reports may be calculated showing every on and off time per date (a detail report), or may be narrowed down with certain figures being an accumulation (a summary report). The light usage detail may come from the RCUS (see Monitoring Capabilities) and therefore be different (i.e. would be actual usage) from what was originally scheduled and sent to RCUs. They may be printed and/or viewed on the computer display. They may be printed on separate pages by facility or printed on continuous paper.

Monitoring Capabilities:

As previously mentioned, if a 2-way communication system exists enabling the RCUs to talk back to the LCIS, then information gathered in such a manner can be relayed to the user. Information such as verification that the lights are on, power outage notification, field-use confirmation via keypad, etc. can be displayed on forms of the LCIS and/or logged for later printing.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A software integration program to automate lighting control, the software integration program comprising:

a computer usable medium having computer readable program code embodied in the medium for control of remote control units (RCUs) manufactured by a first company based on information received from facilities reservation and booking software (FRBS) developed by a different company;

computer readable program code means for setting up lighting related options and preferences from a remote location;

computer readable program code means for allowing a user to assign remote control units (RCUs) and zones to appropriate locations, the location having data within the database of the FRBS;

computer readable program code means for getting data from the database of the FRBS by one of reading special output files produced by the FRBS or reading data directly from a database of the FRBS; and working with the data to automate lighting control to produce lighting schedules.

2. A software integration program to automate lighting control in accordance with claim 1 wherein assembly of the data occurs in an internal database of the software integration program.

3. A software integration program to automate lighting control in accordance with claim 1 further comprising automating a process of getting data from and receiving data from the FRBS.

4. A software integration program to automate lighting control in accordance with claim 1 further comprising sending the data to remote control units (RCUs).

5. A software integration program to automate lighting control in accordance with claim 4 further comprising the step of notifying the software integration program to get data from the FRBS.

6. A software integration program to automate lighting control in accordance with claim 4 further comprising the step of polling the data at a predetermined time by the software integration program.

7. A software integration program to automate lighting control in accordance with claim 3 wherein automating a process of getting data from and receiving data from the FRBS comprises:

one of notifying the software integration program to gather data from the FRBS or polling the data at predetermined time intervals by the software integration program; and transferring the data to remote control units (RCUs) after the data is transferred to the software integration program and schedules are generated.

8. A software integration program to automate lighting control in accordance with claim 1 wherein the means for setting up lighting related options and preferences from a remote location further comprises entering data related to warm-up time of the lights, sunset times, sunrise times, and grace period time.

9. A software integration program to automate lighting control in accordance with claim 8 wherein working with the data to automate lighting control to produce lighting schedules comprises taking reservation data and applying the lighting related options and preferences.

10. A software integration program to automate lighting control, the software integration program comprising:

a computer usable medium having computer readable program code embodied in the medium for control of remote control units (RCUs) manufactured by a first company based on information received from facilities reservation and booking software (FRBS) developed by a different company;

computer readable program code means for setting up lighting related options and preferences from a remote location;

computer readable program code means for allowing a user to assign remote control units (RCUs) and zones to appropriate locations, the location having data within the database of the FRBS;

computer readable program code means for getting data from the database of the FRBS by one of reading special output files produced by the FRBS or reading data directly from a database of the FRBS; and working with the data to automate lighting control to produce lighting schedules; and automating a process of getting data from and receiving data from the FRBS wherein automating a process of getting data from and receiving data from the FRBS comprises:

one of notifying the software integration program to gather data from the FRBS or polling the data at predetermined time intervals by the software integration program; and transferring the data to remote control units (RCUs) after the data is transferred to the software integration program and schedules are generated;

wherein assembly of the data occurs in an internal database of the software integration program.

11. A software integration program to automate lighting control in accordance with claim 10 further comprising sending the data to remote control units (RCUs) in one of an automated or on demand fashion.

12. A software integration program to automate lighting control in accordance with claim 10 wherein the means for setting up lighting related options and preferences from a remote location further comprises entering data related to warm-up time of the lights, sunset times, sunrise times, and grace period time.

13. A software integration program to automate lighting control in accordance with claim 12 wherein working with the data to automate lighting control to produce lighting schedules comprises taking reservation data and applying the lighting related options and preferences.

* * * * *